United States Patent
Voorhees

(10) Patent No.: US 6,382,584 B1
(45) Date of Patent: May 7, 2002

(54) SELF LEVELING MACHINE SUPPORT

(75) Inventor: Peter Garrett Voorhees, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 09/273,880

(22) Filed: Mar. 22, 1999

(51) Int. Cl.[7] .............................................. F16M 11/00
(52) U.S. Cl. ...................... 248/901; 248/673; 248/674
(58) Field of Search ................................ 248/674, 677, 248/678, 637, 644, 679, 675, 646, 673, 188.1, 188.2, 188.3, 188.4, 649, 676, 592, 593, 602, 604, 639, 346.01, 346.05, 163.1

(56) References Cited

U.S. PATENT DOCUMENTS

| | | | | |
|---|---|---|---|---|
| 2,941,573 A | * | 6/1960 | Cassady | 156/60 |
| 3,167,290 A | * | 1/1965 | Beckwell | 248/163.1 |
| 3,288,421 A | * | 11/1966 | Peterson | 248/163.1 |
| 3,577,659 A | * | 5/1971 | Kail | 248/396 |
| 3,799,253 A | * | 3/1974 | Kelp | 165/111 |
| 4,262,870 A | * | 4/1981 | Kretchman et al. | 248/188.3 |
| 4,592,532 A | * | 6/1986 | Stith, Jr. | 248/649 |
| 4,679,489 A | * | 7/1987 | Jasinski et al. | 91/36 |
| 4,731,915 A | * | 3/1988 | Holder | 29/402.3 |
| 4,767,208 A | * | 8/1988 | Cain et al. | 356/138 |
| 4,972,806 A | * | 11/1990 | Marsault | 248/901 X |
| 5,065,844 A | * | 11/1991 | Hon | 187/17 |
| 5,143,386 A | * | 9/1992 | Uriarte | 280/6.1 |
| 5,342,016 A | * | 8/1994 | Marsault et al. | 248/901 X |
| 5,417,394 A | * | 5/1995 | Knorr et al. | 248/188.4 |
| 5,542,642 A | * | 8/1996 | Rivard | 248/676 |
| 5,704,582 A | * | 1/1998 | Golembiewski et al. | 248/500 |

* cited by examiner

Primary Examiner—Ramon O. Ramirez
Assistant Examiner—Tan Le
(74) Attorney, Agent, or Firm—Haynes and Boone, LLP

(57) ABSTRACT

A self leveling support for a machine includes a top plate, a base, a first supporting structure, and a second supporting structure. The top plate has a surface resting substantially along a first plane before thermal expansion. The first supporting structure is connected between the top plate and the base. The second supporting structure is connected between the top plate and the base. The surface of the top plate will be in a second plane substantially parallel to the first plane during thermal expansion of the machine, the first supporting structure, and the second supporting structure.

31 Claims, 3 Drawing Sheets

SELF LEVELING MACHINE SUPPORT

FIELD OF INVENTION

This invention is related generally to supports and, more particularly, to a self leveling support for a machine.

BACKGROUND OF THE INVENTION

Machines often require one or more structures to support various sections or portions of the machine above a ground surface. For example, steam turbines often have a structure positioned under each of the bearing case assemblies located at opposite ends of the steam turbine. These structures provide a level platform for supporting the bearing case assemblies.

One of the problems with these prior structures is with the changes which can occur as a result of thermal expansion. Often the machines being supported by these structures operate at high temperatures. The heat generated by these machines causes the structures to grow. Unfortunately, different portions or sections of the structure are often heated at different rates depending upon their distance from the heat source, in this example the machine. As a result, these different portions or sections of the structures grow at different rates resulting in alignment problems. For example, with a steam turbine the structures no longer provide a level platform for the bearing case assemblies.

SUMMARY OF THE INVENTION

A self leveling support in accordance with one embodiment of the present invention includes a top plate, a first supporting structure, and a second supporting structure. The top plate has a surface resting substantially along a first plane before thermal expansion. The first and second supporting structures are each connected to the top plate. During thermal expansion of the first supporting structure and the second supporting structure, the self leveling support is designed to maintain the surface of the top plate in a second plane which is substantially parallel to the first plane.

A self leveling support in accordance with another embodiment of the present invention also includes a top plate, a base, a first supporting structure, and a second supporting structure. The top plate has a surface which rests substantially along a first plane before thermal expansion and is located adjacent to the machine. The first supporting structure has a first length and a first coefficient of thermal expansion and is connected to the top plate and is connected to the base at a first angle. The second supporting structure has a second length and a second coefficient of thermal expansion and is connected to the top plate and is connected to the base at a second angle. The first length, the second length, the first coefficient of thermal expansion, the second coefficient of thermal expansion, the first angle, and the second angle are selected so that during the thermal expansion of the machine, the first supporting structure and the second supporting structure, the surface of the top plate will be in a second plane which is substantially parallel to the first plane.

A self leveling support in accordance with yet another embodiment of the present invention also includes a top plate, a base, a first supporting structure, and a second supporting structure. The top plate has a surface and rests against the machine. The first supporting structure is connected between the top plate and the base. The second supporting structure is connected between the top plate and the base. The self leveling support has a first cold state in which the first supporting structure has a first cold state length and is connected to the base at a first cold state angle and the second supporting structure has a second cold state length and is connected to the base at a second cold state angle and the upper surface of the top plate rests substantially in a first plane. The self leveling support also has a second hot state in which the first supporting structure has a first hot state length and is connected to the base at a first hot state angle and the second supporting structure has a second hot state length and is connected to the base at a second hot state angle and the surface of the top plate will be in a second plane which is substantially parallel to the first plane.

The self leveling support for a machine provides a number of advantages. For example, one of the advantages is that the self leveling support is designed to compensate for the effects of thermal expansion. As a result, the support remains properly aligned with respect to the machine or portion of the machine it is supporting regardless of the heat being generated by the machine or other heat source.

Another advantage of the present invention is that the self leveling support remains properly aligned with respect to the machine or portion of the machine it is supporting even when different portions of the support are experiencing different rates of thermal expansion. Typically, one portion of the support will be closer to the heat source, then another portion. As a result, the one portion will grow more than the other portion. The present invention compensates for these different rates of thermal expansion.

Yet another advantage of the present invention is that the self leveling support is able to maintain a surface of the self leveling support in a plane which is substantially parallel to the plane the surface was resting in prior to any thermal expansion. As discussed above, the self leveling support is able to compensate for thermal expansion and for different rates of thermal expansion within the support.

DETAILED DESCRIPTION

Figure 1:
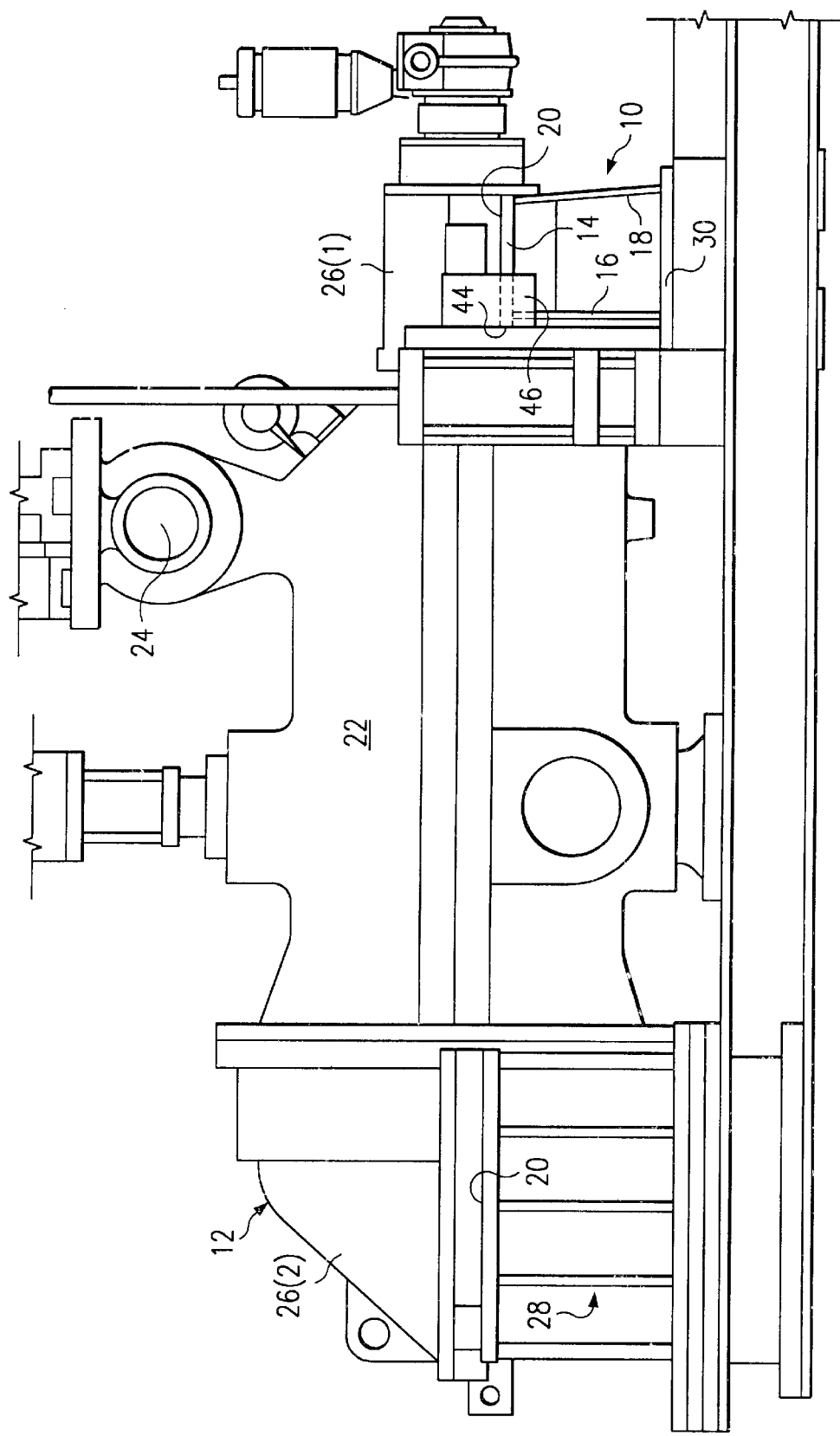
FIG. 1 is a side view of a machine with a self leveling support in accordance with one embodiment of the present invention.

A self leveling support 10 for a machine 12 in accordance with one embodiment of the present invention is illustrated in FIGS. 1 and 2. The self leveling support 10 includes a top plate 14, a first support plate 16, and a second support plate 18. The self leveling support 10 provides a number of advantages including providing a support 10 which not only compensates for thermal expansion, but is able to compensate for different rates of thermal expansion within the support 10. Additionally, the self leveling support 10 is able to maintain a surface 20 of the top plate 14 in a plane B—B which is substantially parallel to a plane A—A the surface 20 was resting in prior to thermal expansion.

Referring more specifically to FIG. 1, the machine 12 with a self leveling support 10 in accordance with one embodiment of the present invention is illustrated. In this particular embodiment, the machine 12 is a steam turbine, although the support 10 can be used with other types of machines. The machine 12 includes a housing 22 with an inlet 24 to receive steam and bearing case assemblies 26(1) and 26(2) located at opposing ends of the housing 22. Supports 10 and 28 are positioned under the bearing case assemblies 26(1) and 26(2) and are used to hold and provide a level surface 20 for each of the bearing case assemblies 26(1) and 26(2). In this particular embodiment, the level surface 20 is substantially horizontal, although the surface 20 could rest in other planes. Steam, which is used to drive the turbine, is introduce via the inlet 24. As a result, the temperature of the portion or section of the steam turbine adjacent the inlet 24 rises during operation of the turbine. In this particular embodiment, the portion of the housing 22 adjacent support 28 does not generate much heat. As a result, support 28 does not experience much thermal growth during operation of machine 12. If support 28 did experience more thermal growth, support 28 could be replaced with another support like self leveling support 10 to compensate for the thermal expansion.

Figure 2A:
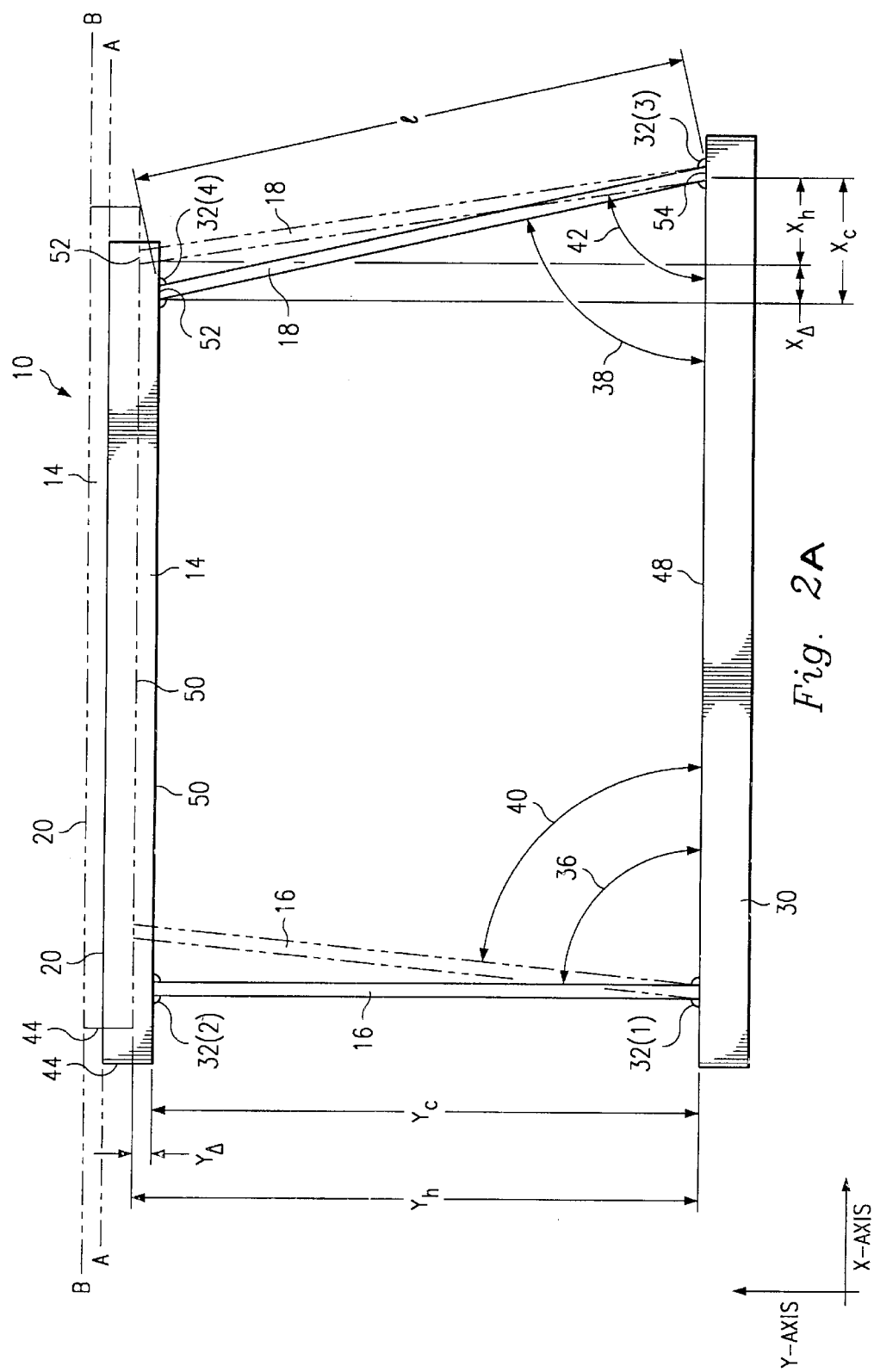
FIG. 2A is a side view of the self leveling support in a cold state and in a hot state (shown in phantom)
Figure 3:
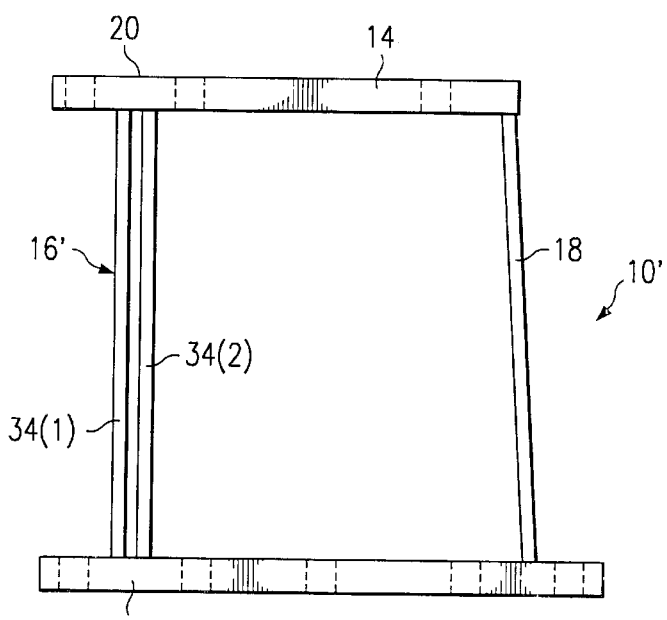
FIG. 3 is a side view of a self leveling support in accordance with another embodiment of the present invention.

Referring to FIG. 2A, the self leveling support 10 in accordance with one embodiment of the present invention in cold and hot states is illustrated. The first and second support plates 16 and 18 are each connected between the top plate 14 and a base 30. The connection points 32(1), 32(2), 32(3), and 32(4) between the first and second support plates 16 and 18 and the top plate 14 and the base 30 are designed to permit some movement between the top plate 14 and the first and second support plates 16 and 18 and also between the base 30 and the first and second support plates 16 and 18 without breaking the connections 32(1), 32(2), 32(3), and 32(4). In this particular embodiment, the ends of the first and second support plates 16 and 18 are connected to the top plate and to the base by welds, although other types of connections 32(1), 32(2), 32(3), and 32(4), such as mechanical pivoting connections, can also be used. Although one example of the first and second support plates 16 and 18 is shown, other types of supporting structures can also be used for the first and second support plates 16 and 18 as would be readily apparent to one of ordinary skill in the art. For example, as shown in FIG. 3, the self leveling support 10' the first support plate 16' may comprise a pair of plates 34(1) and 34(2) which are connected between the top plate 14 and the base 30.

Referring back to FIG. 2A, to compensate for thermal expansion of the self leveling support 10, the first support plate 16 is made shorter than the second support plate 18, although the length of the first support plate 16 with respect to the second support plate 18 can vary based on the particular application. The amount the first and second support plates 16 and 18 will grow depends upon the temperature the first and second support plates 16 and 18 are exposed to, the duration the first and second support plates 16 and 18 are exposed to the increased temperature, and the coefficient of thermal expansion of the first and second support plates 16 and 18. The first support plate 16 has a first coefficient of thermal expansion and the second support plate 18 has a second coefficient of thermal expansion. In this particular embodiment, the first and second support plates 16 and 18 are made of the same material and thus the first and second coefficient of thermal expansions are the same, although the material used for and the coefficient of thermal expansion of the first and second plates 16 and 18 can be different.

To compensate for thermal expansion of the self leveling support 10, the first support plate 16 and the second support plate 18 are also connected to the base 30 at different angles, although the angles at which the first and second support plates 16 and 18 are connected to the base 30 can vary based on the particular application. In a cold state, the first support plate 16 is connected to the base 30 at a first cold state angle 36 and the second support plate 18 is connected at a second cold state angle 38. By way of example only, in this particular embodiment the first cold state angle 36 is about 90 degrees and the second cold state angle 38 is about 85.5 degrees. In a hot state, the first support plate 16 is connected to the base 30 at a first hot state angle 40 and the second support plate 18 is connected to base 30 at a second hot state angle 42. Although a base 30 is shown in this particular embodiment, the base 30 is optional. The ends 31 and 33 of the first and second support plates 16 and 18 could be connected to a supporting surface directly without a base.

The top plate 14 has a surface 20 which rests in a first plane A—A. In this particular embodiment, the first plane A—A is substantially horizontal, although the surface can rest in other planes. The bearing case assembly 26(1) rests on this surface 20 of the top plate 14. One of the advantages of the present invention is that the self leveling support 10 is able to maintain a level surface 20 for supporting the bearing case assembly 26(1) even during thermal expansion. In this particular embodiment, one end or side edge 44 of the top plate 14 also rests against a surface 46 of the machine 12, although the side edge 44 of the top plate 14 does not need to contact the machine 12.

Figure 2B:
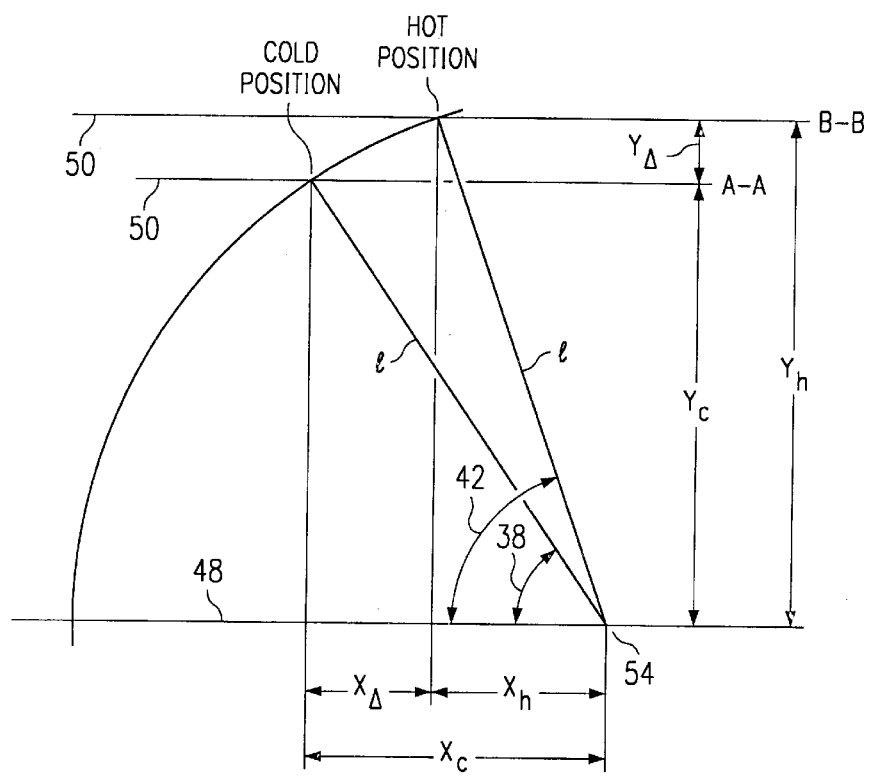
FIG. 2B is a diagram illustrating the relationship of the different lengths and positions of supporting structures in the self leveling support shown in FIG. 2A.

Referring to FIGS. 2A and 2B, the different lengths, positions, and connection points of the first and second support plates 16 and 18, the top plate 14 and the base 30 for self leveling support 10 are illustrated. The height of the self leveling support 10 in a cold state measured along the Y-axis between one surface 48 of the base 30 and another surface 50 of the top plate 14 is shown as $Y_C$, the height of the self leveling support 10 in a hot state measured between one surface 48 of the base 30 and another surface 50 of the top plate 14 is shown as $Y_H$, and the difference between $Y_H$ and $Y_C$ is shown as $Y_\Delta$. The offset or compensating distance in the cold state measured along the X-axis from the location where one end 52 of the second support plate 18 is connected to the top plate 14 to the location the other end 54 of the second support plate 18 is connected to the base 30 is $X_C$, the offset or compensating distance in the hot state measured along the X-axis from the location one end 52 of the second support plate 18 is connected to the top plate 14 to the location the other end 54 of the second support plate 18 is connected to the base is $X_H$, and the difference between $X_C$ and $X_H$ is shown as $X_\Delta$. The length of the second support plate 18 in the cold state is shown as 1. By way of example, when the other variables are known or are measured through experimentation, the offset or compensating distance $X_C$ can be solved for as illustrated in the equations below:

$$1^2 = X_c^2 + Y_c^2 \quad X_h = X_c - X_\Delta$$

$$1^2 = X_h^2 + Y_h^2 \quad Y_h = Y_c + Y_\Delta$$

Solve for $X_C$ $$X_C^2 + Y_C^2 = (X_C - X_\Delta)^2 + (Y_C + Y_\Delta)^2$$

$$X_C^2 + Y_C^2 = X_C^2 - 2X_C X_\Delta + X_\Delta^2 + Y_C^2 + 2Y_C Y_\Delta + Y_\Delta^2$$

$$2X_C X_\Delta = X_\Delta^2 + 2Y_C Y_\Delta + Y_\Delta^2$$

$$X_c = \frac{X_\Delta^2 + 2Y_c Y_\Delta + Y_D^2}{2X_\Delta}$$

The operation of the self leveling support 10 will be explained with reference to FIGS. 1 and 2A. Prior to operation of the machine 12, the machine 12 and the self leveling support 10 are in a cold state. In this particular embodiment, the first support plate 16 is initially connected to the top plate 14 at about a right angle. Meanwhile, the second support plate 18 is initially connected to the base 30 at an angle less than ninety degrees. As a result, the second support plate 18 is slightly longer than the first support plate 16 to keep the surface 20 of the top plate 14 level with a first plane A—A in the cold state. The self leveling support 10 in the cold state is shown in solid lines in FIG. 2A.

During operation of the machine 12, the steam enters the machine 12 via the inlet 24 and heats the housing 22 adjacent the inlet 24. The housing 22 acts as a heat source for any surround structures including the self leveling support 10. Since the first support plate 16 is located closer to the operating machine 12 than the second support plate 18, the first support plate 16 experiences higher temperatures and more heat than the second support plate 18 which is spaced further away from the machine 12. As a result, the first support plate 16 experiences more vertical thermal expansion than the second support plate 18.

Meanwhile, the heat also cause the machine 12 to itself expand. As a result, the machine 12 expands towards the self leveling support 10 and pushes the top plate 14 away from the machine 12 causing the self leveling support 10 to "sway" to the right in this example. In particular embodiment, the side edge 44 of the top plate 14 rests against the surface 46 of the machine 12, although other configurations can be used, such as spacing side edge 44 adjacent to, but not in contact with surface 46 in a cold state. The movement of the top plate 14 along with the thermal growth and movement of the first and second support plates 16 and 18 moves the first support plate 16 up and to the right so that the first support plate 16 is now connected to the base 30 at an angle 40 which is less than ninety degrees in this example. The movement of the top plate 14 along with the expansion and movement of the first and second support plates 16 and 18 also moves the second support plate 18 to the right so that the second support plate 18 is now connected to the base 30 at an angle 42 which begins to approach ninety degrees. An advantage of the present invention is the self leveling support's 10 ability to not only compensate for the effects of thermal expansion, but its ability to compensate for differing rates of thermal expansion within the support 10.

The length of the first and second support plates 16 and 18 in the cold state and the particular angles 36 and 38 at which the first and second support plates 16 and 18 are initially connected to the base 30 in the cold state are selected based upon the different temperatures the first and second support plates 16 and 18 will experience in a hot state, the duration of the higher temperatures, and the coefficients of thermal expansion of the first and second support plates 16 and 18 so that the surface 20 of the top plate 14 remains level in a plane B—B in the hot state. The plan B—B on which the surface 20 of the top plate 17 rests in the hot state is substantially parallel to the plane A—A the surface 20 of the top plate 14 rests in the cold state. The particular lengths and connection angles of first and second support plates 16 and 18 to the base 30 and top plate 14 will vary from application to application. These lengths and angles can be determined experimentally by measuring the growth the first and second support plates 16 and 18 experience at the temperatures they will experience in the particular application and/or by calculating the growth the first and second support plates 16 and 18 using the temperatures they will experience and the coefficients of thermal expansion of the first and second support plates 16 and 18.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A support assembly for supporting a machine relative to a surface while the machine is subjected to a source of heat, the assembly comprising:

a support member for receiving the machine; and two support plates connected to the member and extending from the member to the surface, the plates being subject to different thermal expansion in response to the application of the heat source;

the respective dimensions of the plates extending from the member to the surface being different, and the respective angles that the plates extend relative to the member being different;

the dimensions and the angles being selected so that the plates support the member, and therefore the machine, in a first plane prior to the thermal expansion of the plates, and in a second plane substantially parallel to the first plane after the thermal expansion of the plates.

2. The assembly of claim 1 wherein the member, and therefore the machine, extends substantially horizontally before and after the thermal expansion.

3. The assembly of claim 1 wherein the plates have the same coefficient of thermal expansion and wherein one of the plates extends closer to the heat source than the other plate and therefore is subjected to greater thermal expansion than the other plate.

4. The assembly of claim 3 wherein the dimension of the one plate is less than that of the other plate.

5. The assembly of claim 1 wherein before the thermal expansion, one of the plates extends at an angle of approximately 90 degrees relative to the member and the other plate extends at an angle less than 90 degrees relative to the member.

6. The assembly of claim 5 wherein after the thermal expansion, the one plate extends at an angle less than 90 degrees relative to the member, and the other plate extends at an angle less than 90 degrees relative to the member.

7. The assembly of claim 1 wherein the machine thermally expands in response to the application of the heat source, and wherein the member and the plates are located relative to the machine so that they move in response to the latter thermal expansion.

8. The assembly of claim 7 wherein the dimensions and the angles are selected to accommodate the latter thermal expansion.

9. A support assembly for supporting a machine relative to a surface while the machine is subjected to a source of heat, the assembly comprising:

a support member for receiving the machine; and two support plates connected to the member and extending from the member to the surface, the coefficient of thermal expansion of the plates being different, and the respective angles that the plates extend relative to the member being different;

the coefficients and the angles being selected so that the plates support the member, and therefore the machine, in a first plane prior to the thermal expansion of the plates, and in a second plane substantially parallel to the first plane after the thermal expansion of the plates.

10. The assembly of claim 9 wherein the member, and therefore the machine, extends substantially horizontally before and after the thermal expansion.

11. The assembly of claim 9 wherein the respective dimensions of the plates extending from the member to the surface are different.

12. The assembly of claim 9 wherein before the thermal expansion, one of the plates extends at an angle of approximately 90 degrees relative to the member and the other plate extends at an angle less than 90 degrees relative to the member.

13. The assembly of claim 12 wherein after the thermal expansion, the one plate extends at an angle less than 90 degrees relative to the member, and the other plate extends at an angle less than 90 degrees relative to the member.

14. The assembly of claim 9 wherein the machine thermally expands in response to the application of the heat source, and wherein the member and the plates are located relative to the machine so that they move in response to the latter thermal expansion.

15. The assembly of claim 14 wherein the dimensions and the coefficients are selected to accommodate the latter thermal expansion.

16. A method of supporting a machine relative to a surface while the machine is subjected to a source of heat, the method comprising:

providing a support member for receiving the machine;

connecting two support plates to the member at different angles relative to the member, the plates extending from the member to the surface;

locating the plates relative to the heat source so that they are subject to different thermal expansion in response to the application of the heat source;

forming the plates so that the respective dimensions of the plates extending from the member to the surface are different;

positioning the plates so that they extend at different angles relative to the member; and selecting the dimensions and the angles so that the plates support the member, and therefore the machine, in a first plane prior to thermal expansion of the plates, and in a second plane substantially parallel to the first plane after the thermal expansion of the plates.

17. The method of claim 16 wherein the member, and therefore the machine, extends substantially horizontally before and after the thermal expansion.

18. The method of claim 16 wherein the plates have the same coefficient of thermal expansion and wherein one of the plates extends closer to the heat source than the other plate and therefore is subjected to greater thermal expansion than the other plate.

19. The method of claim 18 wherein the dimension of the one plate is less than that of the other plate.

20. The method of claim 16 wherein before the thermal expansion, one of the plates extends at an angle of approximately 90 degrees relative to the member and the other plate extends at an angle less than 90 degrees relative to the member.

21. The method of claim 20 wherein after the thermal expansion, the one plate extends at an angle less than 90 degrees relative to the member, and the other plate extends at an angle less than 90 degrees relative to the member.

22. The method of claim 16 wherein the machine thermally expands in response to the application of the heat source, and further comprising locating the plates relative to the machine so that they move in response to the latter thermal expansion.

23. The method of claim 22 wherein the dimensions and the angles are selected to accommodate the latter thermal expansion.

24. A method of supporting a machine relative to a surface while the machine is subjected to a source of heat, the method comprising:

providing a support member for receiving the machine;

providing two support plates having different coefficients of thermal expansion;

connecting the plates to the member, the plates extending from the member to the surface;

locating the plates relative to the heat source so that they are subject to different thermal expansion in response to the application of the heat source;

positioning the plates so that they extend at different angles relative to the member; and selecting the coefficients and the angles so that the plates support the member, and therefore the machine, in a first plane prior to the thermal expansion of the plates, and in a second plane substantially parallel to the first plane after the thermal expansion of the plates.

25. The method of claim 24 wherein the member, and therefore the machine, extends substantially horizontally before and after the thermal expansion.

26. The method of claim 24 wherein one of the plates extends closer to the heat source than the other plate and therefore is subjected to greater thermal expansion than the other plate.

27. The method of claim 26 wherein the dimension of the one plate is less than that of the other plate.

28. The method of claim 24 wherein before the thermal expansion, one of the plates extends at an angle of approximately 90 degrees relative to the member and the other plate extends at an angle less than 90 degrees relative to the member.

29. The method of claim 28 wherein after the thermal expansion, the one plate extends at an angle less than 90 degrees relative to the member, and the other plate extends at an angle less than 90 degrees relative to the member.

30. The method of claim 24 wherein the machine thermally expands in response to the application of the heat source, and further comprising locating the plates relative to the machine so that they move in response to the latter thermal expansion.

31. The method of claim 30 wherein the dimensions and the angles are selected to accommodate the latter thermal expansion.

* * * * *